United States Patent

Kokura et al.

Patent Number: 5,483,460
Date of Patent: Jan. 9, 1996

[54] NUMERICALLY CONTROLLED MACHINE TOOL HAVING SWITCH MATRICES WITH A REDUCED NUMBERS OF SIGNAL LINES

[75] Inventors: Masuo Kokura, Hino; Yasuharu Aizawa, Minamitsuru, both of Japan

[73] Assignee: Fanuc Ltd., Yamanashi, Japan

[21] Appl. No.: 290,900

[22] PCT Filed: Jan. 6, 1994

[86] PCT No.: PCT/JP94/00037

§ 371 Date: Aug. 23, 1994

§ 102(e) Date: Aug. 23, 1994

[87] PCT Pub. No.: WO94/16380

PCT Pub. Date: Jul. 21, 1994

[30] Foreign Application Priority Data

Jan. 18, 1993 [JP] Japan .................................. 5-005763

[51] Int. Cl.$^6$ .................................................. G05B 19/18
[52] U.S. Cl. ................ 364/474.01; 364/141; 340/825.79
[58] Field of Search ........................ 364/474.22, 474.27, 364/191–193, 188, 189, 140, 141, 146, 474.01; 318/568.1, 567; 340/825.79–825.96

[56] References Cited

U.S. PATENT DOCUMENTS 4,168,426  9/1979  Furukawa ............................ 318/569 X
4,419,761  12/1983  Kuze ................................... 364/143 X
4,616,306  10/1986  Kuzma et al. ........................... 364/140

FOREIGN PATENT DOCUMENTS 1-149118  6/1989  Japan .
4-21019   1/1992  Japan .

Primary Examiner—Joseph Ruggiero
Attorney, Agent, or Firm—Staas & Halsey

[57] ABSTRACT

A numerically controlled machine tool which requires fewer signal lines between a machine control console and a numerical control unit. Switch matrixes (1, 2, ... n) have matrix elements (S111, S112, ...) disposed thereto in a matrix shape. Common signals (COM1, COM2, ... COMj) are supplied to the common lines COM of the switch matrixes (1, 2, ... n). Output data signals (DAT11, DAT12, ... DAT2l) are supplied from data lines (DAT1, DAT2) of the switch matrixes (1, 2, ... n). In the same way, input data signals (DATn1, DATn2, ... DATnm) are supplied from data lines (DATn) of the switch matrixes (1, 2, ... n). With this arrangement, unnecessary common lines are reduced by providing the common lines COM with the switch matrixes (1, 2, ... n).

4 Claims, 5 Drawing Sheets

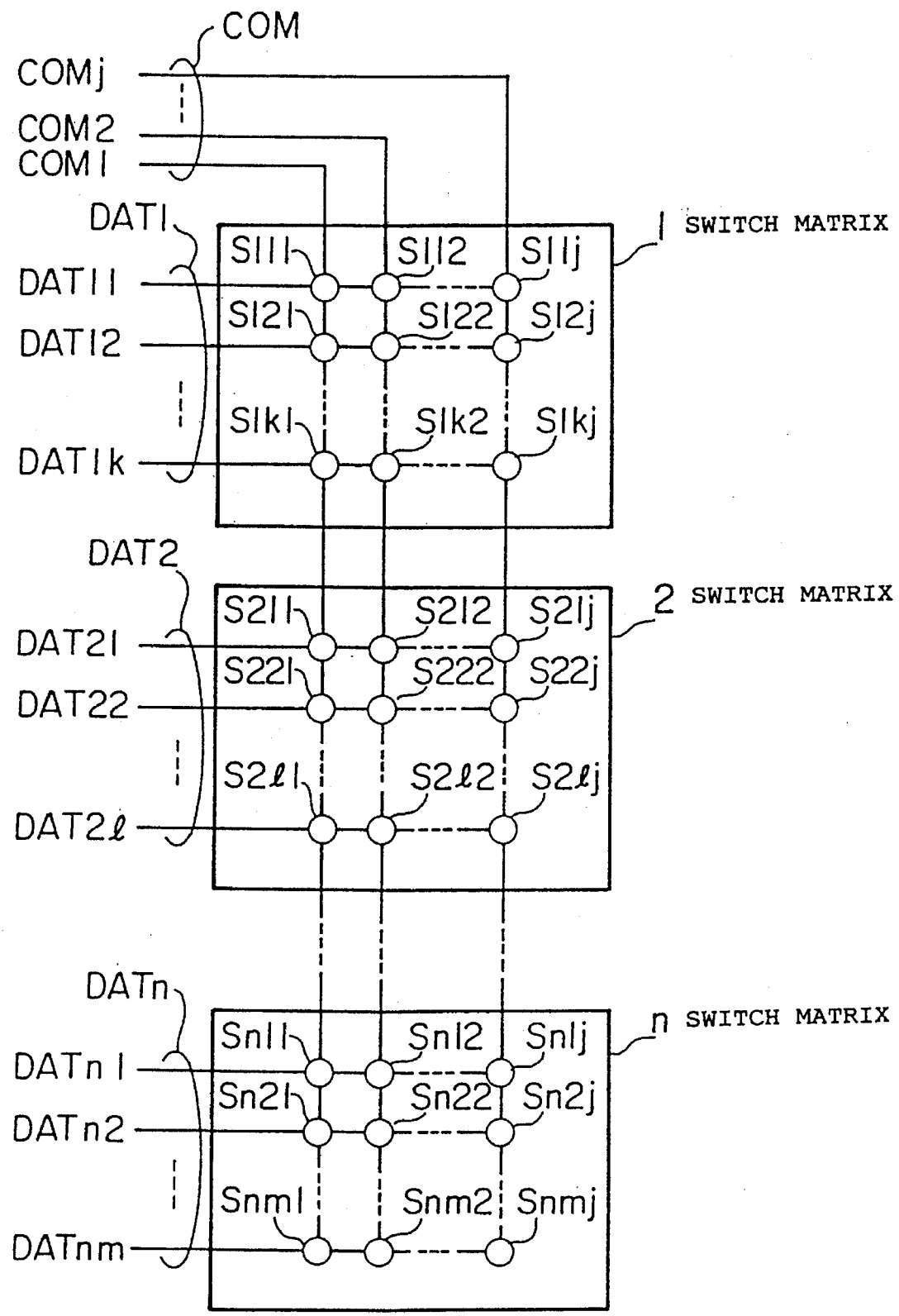
F I G. 1

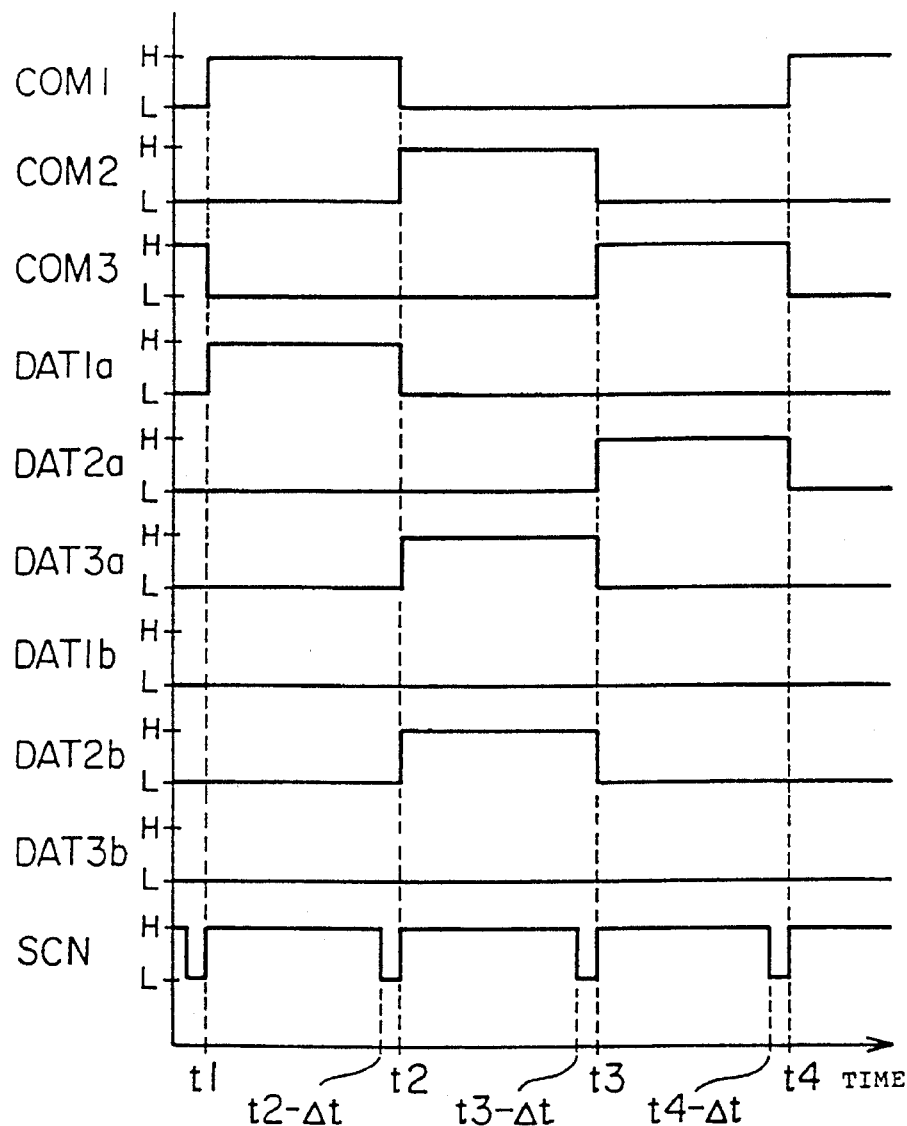

NUMERICALLY CONTROLLED MACHINE TOOL HAVING SWITCH MATRICES WITH A REDUCED NUMBERS OF SIGNAL LINES

BACKGROUND OF THE INVENTION

1. Field of the Invention

The present invention relates to a numerically controlled machine tool for machining a workpiece according to a command entered from a keyboard or the like, and more specifically, to a numerically controlled machine tool provided with a machine control console including a keyboard, changeover switches and the like.

2. Description of the Related Art

Recently, a keyboard and switches such as changeover switches and the like on a machine control console provided for a numerically controlled machine tool give a feeling of operation by emitting an LED (light emitting diode) when they are pressed. The light emitting diode is particularly useful when a switch difficult to give a feeling of operation such as a flat key switch is pressed.

In general, an on/off state of switches on a machine control console is determined by means of a matrix. The determination of the on/off state is carried out in such a manner that the switches are caused to correspond to the points of intersections on the matrix and a common signal is supplied to each common line. Conventionally, a numerical control apparatus includes driving circuits for supplying a signal to each of the switches on the machine control console and receiving circuits for receiving signals from the machine control console.

Nevertheless, a problem arises in that when the number of signal lines increases between the machine control console and the numerical control apparatus, a noise such as an impulse or the like is liable to be mixed to the signal lines particularly in a factory where the numerical control apparatus is installed and faulty operation of a machine tool is caused by it. Further, another problem arises in that since as many driving circuits and receiving circuits as the number of signal lines are required, cost increases.

SUMMARY OF THE INVENTION

Taking the above into consideration, an object of the present invention is to provide a numerically controlled machine tool by which signal lines between a machine control console and a numerical control unit are reduced to lower a manufacturing cost and to reduce negative affects of noise.

To solve the above problem, according to the present invention, there is provided a numerically controlled machine tool including a numerical control unit and machining a workpiece according to a command input from a keyboard or the like, which comprises switch matrixes having matrix elements disposed thereto in a matrix shape, a first driving circuit for supplying common signals to the common lines of said switch matrixes, a second driving circuit for receiving output signals from data lines of said switch matrixes, and a receiving circuit for receiving input data signals from data lines of said switch matrixes.

The switch matrixes have the matrix elements disposed thereto in a matrix shape. The first driving circuit supplies common signals to the common lines of the switch matrixes.

The second driving circuit receives output data signals from the data lines of the switch matrixes. In the same way, the receiving circuit receives input data signals from the data lines of the switch matrixes.

As described above, since the number of unnecessary common lines can be reduced by the provision of the common wires with the second driving circuit and the receiving circuit, a manufacturing cost can be reduced.

BRIEF DESCRIPTION OF THE DRAWINGS

FIG. 1 is a diagram showing a schematic arrangement of switch matrixes;

FIG. 5 is a time chart showing a change of respective signals on common lines and data lines.

DETAILED DESCRIPTION OF THE PREFERRED EMBODIMENTS

An embodiment of the present invention will be described below with reference to the drawings.

Figure 2:
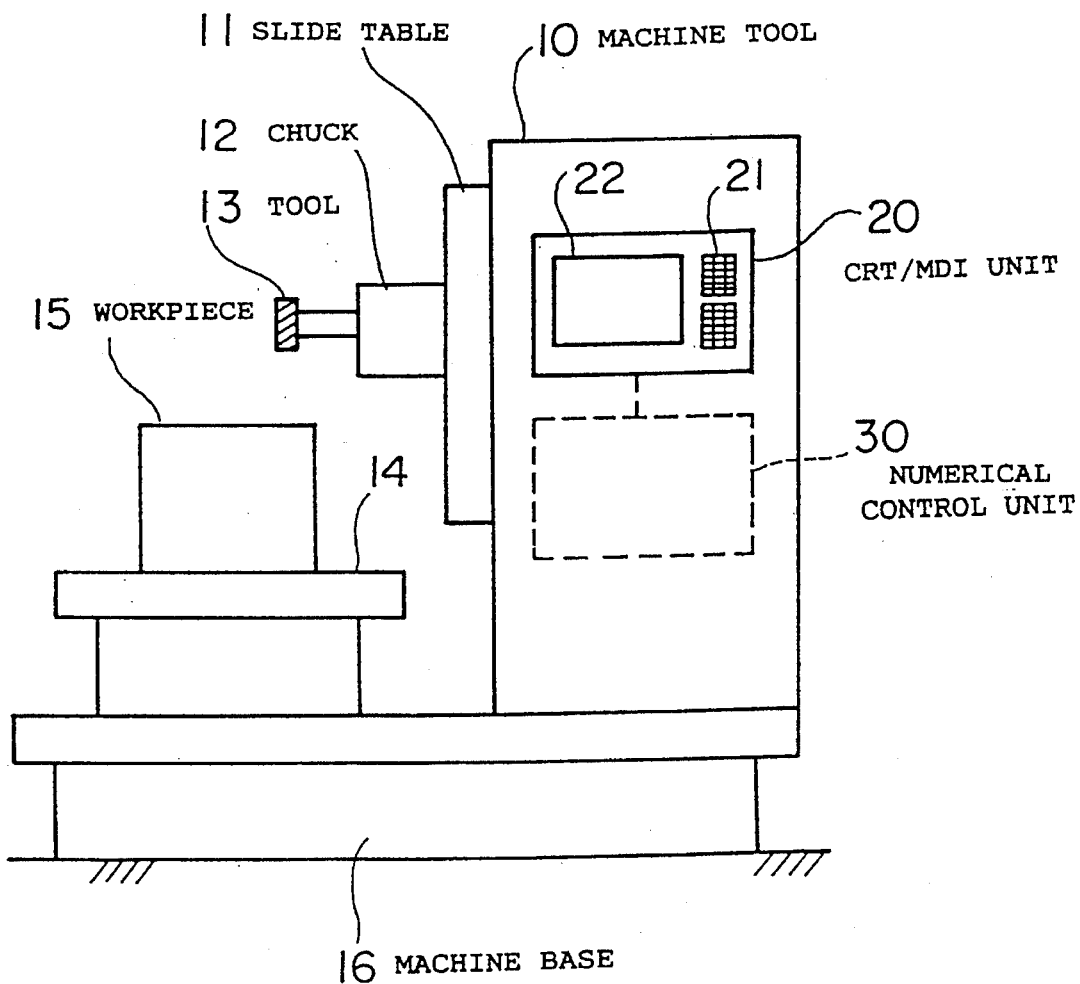
FIG. 2 is a schematic view showing a numerically controlled machine tool in its entirety.

FIG. 2 is a schematic view showing a numerically controlled machine tool in its entirety which embodies the present invention. A numerical control apparatus roughly comprises a machine tool 10 and a numerical control unit 30 incorporated in the machine tool 10.

The machine tool 10 has a slide table 11 disposed on a side surface thereof. A tool 13 gripped by a chuck 12 is moved an upward/downward direction (Z-axis direction) in FIG. 2 by a servomotor incorporated in the machine tool 10. A table 14 moves in a forward/backward direction and a right/left direction (X-axis direction and Y-axis direction) in FIG. 2 and has a workpiece 15 as an object to be machined placed thereon. The machine tool 10 and the table 14 are placed on a machine base 16.

The operator gives an operation command to the numerical control unit 30 through a CRT/MDI unit 20 disposed on the other side surface of the machine tool 10. The CRT/MDI unit 20 includes a keyboard 21, a display unit 22 and the like. The keyboard 21 includes cursor keys, shape element keys, numeric keys and the like, and necessary graphic data, machining data and the like are input through these keys. A CRT or a liquid crystal display panel is used as the display unit 22 and displays shapes, machining conditions and the like when a machining program and the like are generated in an interactive fashion. In addition to the above, although not shown, the CRT/MDI unit 20 also includes software keys whose function is changed depending upon a system program and the like incorporated in the numerical control unit 30.

With the aforesaid arrangement, the slide table 11 and the table 14 of the machine tool 10 are moved in response to a command issued by the operator through the CRT/MDI unit 20 so that the tool 13 is caused to approach the workpiece 15 to carry out desired machining.

Figure 3:
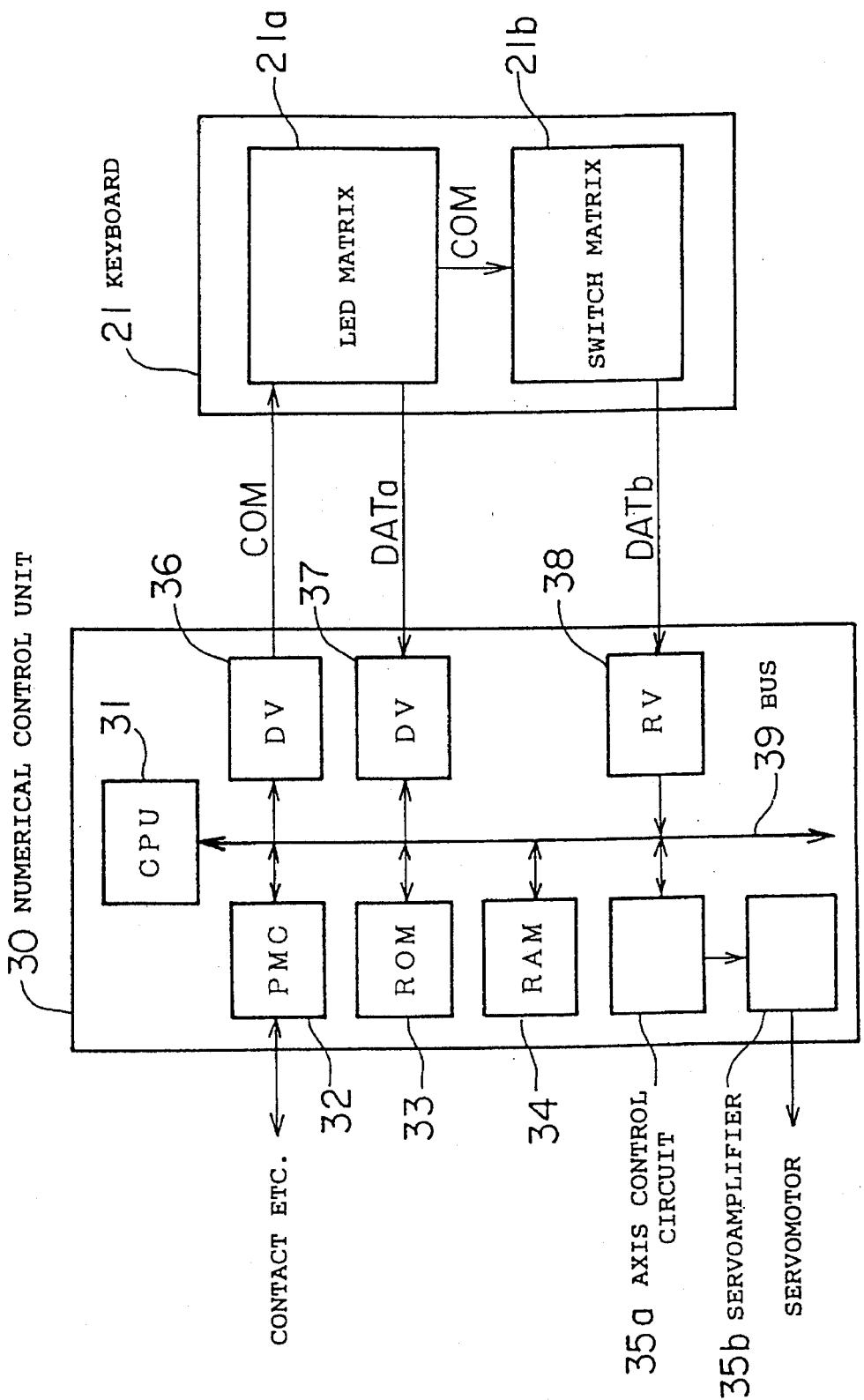
FIG. 3 is a block diagram showing an arrangement of a numerical control unit and a keyboard.

FIG. 3 is a block diagram showing an arrangement of the numerical control unit and the keyboard. In FIG. 3, the numerical control unit 30 is electrically connected to the keyboard 21 through a common line COM, an output data line DATa and an input data line DATb. Note, the numerical control unit 30 in FIG. 3 shows a minimum arrangement needed to embody the present invention.

A CPU (processor) 31 controls the numerical control unit 30 in its entirety according to a system program stored in a ROM 33. The ROM 33 comprises an EPROM or an EEPROM. A RAM 34 comprises an SRAM or the like and temporarily stores various data or input/output signals.

A PMC (programmable machine controller) 32 receives a T function signal (tool selection command) and the like which are supplied from the CPU 31 executing a machining program stored in the RAM 34. The PMC 32 processes the received signal according to a sequence program, and outputs a signal as an operation command to control an actuator and the like in the machine tool 10 shown in FIG. 2. Further, the PMC 32 receives a status signal from a limit switch and the like in the machine tool 10, processes the received signal, and transfers an input signal required by the CPU 31.

An axis control circuit 35a receives an axis movement command from the CPU 31 and outputs an axis command to a servoamplifier 35b. On receiving the axis command, the servoamplifier 35b drives a servomotor disposed in the machine tool 10 of FIG. 2.

A driving circuit (DV) 36 receives a command signal from the CPU 31 and supplies a common signal to be described later to an LED matrix 21a and a switch matrix 21b in the keyboard 21 through the common line COM.

A driving circuit (DV) 37 receives a command signal from the CPU 31 and supplies an output data signal to be described later from the LED matrix 21a in the keyboard 21 through the data line DATa. On receiving a command signal from the CPU 31, a receiving circuit (RV) 38 receives an output data signal to be described later from the switch matrix 21b in the keyboard 21 through the data line DATb. The aforesaid components are interconnected through a bus 39.

FIG. 1 is a diagram showing a schematic arrangement of the switch matrixes, wherein the LED matrix 21a and the switch matrix 21b are schematically shown. Each of switch matrixes 1, 2 ... n includes at least one matrix element S111, S112, ... disposed therein in a matrix shape.

The driving circuit 36 shown in FIG. 3 supplies common signals COM1, COM2, ..., COMj to j pieces of common lines COM connected to the switch matrixes 1, 2, ..., n.

The driving circuits such as the driving circuit 37 and the like receive output data signals DAT11, DAT12 and the like from data lines DAT1, DAT2 and the like connected to the switch matrixes 1, 2, ..., n. In the same way, receiving circuits such as the receiving circuit 38 and the like receive an input data signal DATn1 and the like from data lines DATn connected to the switch matrixes 1, 2, ..., n. Note, the number of lines such as the data lines DAT1, DAT2 and the like are not required to be the same and a different number of lines may be provided depending upon the arrangement of the switch matrixes 1, 2, ..., n.

As described above, since unnecessary common lines may be reduced by the provision of the common lines COM which are common to the driving circuits such as the driving circuit 37 and the like and the receiving circuits such as the receiving circuit 38 and the like, a cost can be suppressed to a low level.

Next, specific arrangements of the LED matrix 21a and the switch matrix 21b will be described.

Figure 4:
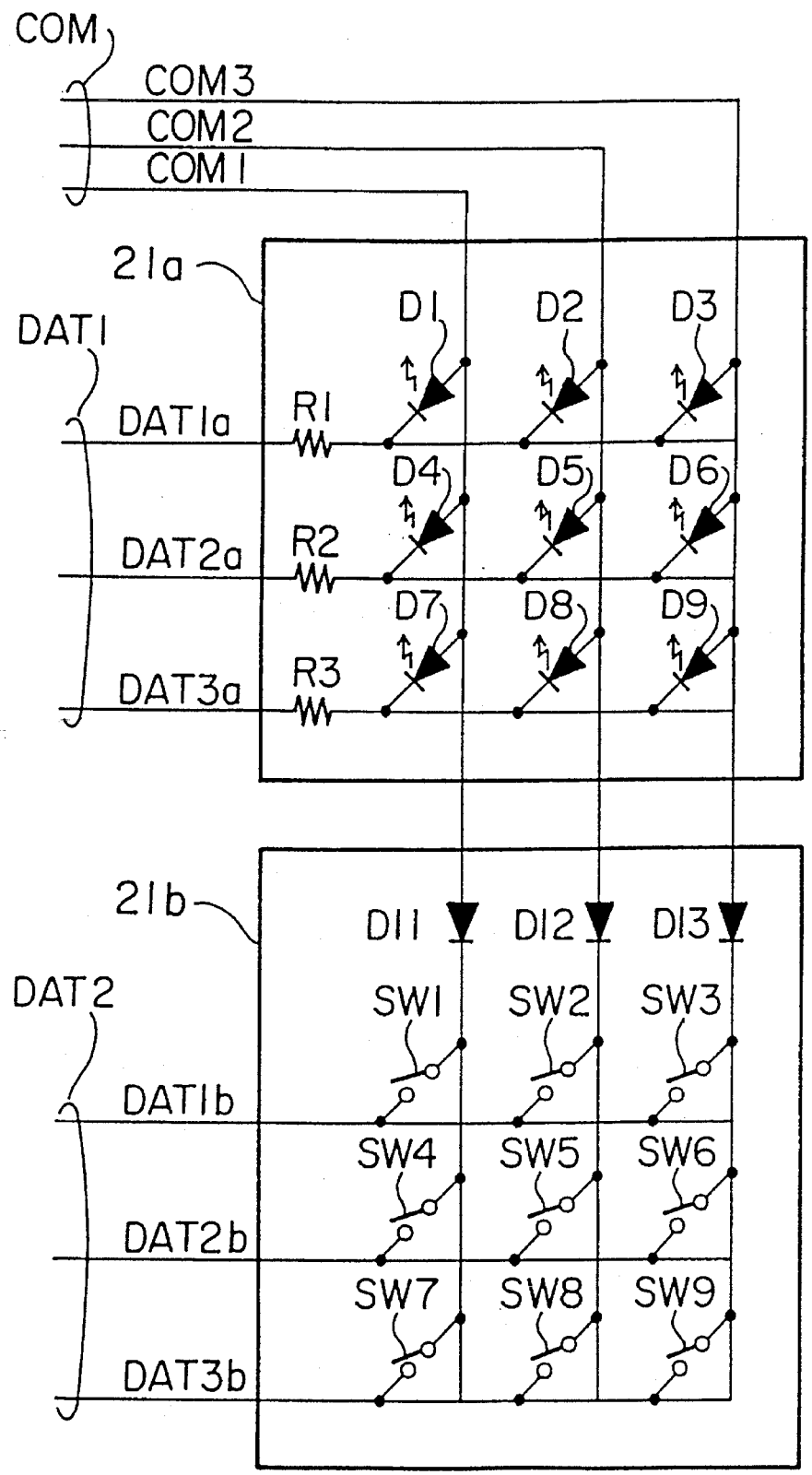
FIG. 4 is a diagram showing a specific arrangement of the switch matrix.

FIG. 4 is a diagram showing the specific arrangements of the LED matrix and the switch matrix. To simplify the description, it is assumed that each of the LED matrix 21a and the switch matrix 21b comprises matrix elements of (3 rows×3 columns). Further, the common lines COM are connected to the driving circuit 36 of FIG. 3, the data lines DAT1 are connected to the driving circuit 37 of FIG. 3, and the data lines DAT2 are connected to the receiving circuit 38 of FIG. 3, respectively. These lines are assumed to be composed of three lines, respectively.

First, the arrangement of the LED matrix 21a will be described. The LED matrix 21a comprises 3 rows of the data lines DAT1 intersecting 3 columns of the common lines COM, and light emitting diodes D1, D2, . . . D9, which correspond to the matrix elements shown in FIG. 1, are disposed at respective points of intersection. For example, the light emitting diode D1 is connected to the common line COM on the anode side thereof and connected to the data line DAT1 on the cathode side thereof. The other light emitting diodes D2, . . . , D9 are connected in the same way as the light emitting diode D1. Further, protective resisters R1, R2, R3 are connected between the matrix elements such as the light emitting diode D1 and the like and the driving circuit 37 to prevent an excessive current from flowing to the driving circuit 37.

Next, the arrangement of the switch matrix 21b will be described. The switch matrix 21b comprises 3 rows of the data lines DAT2 intersecting 3 columns of the common lines COM, and key switches SW1, SW2, . . . SW9, which correspond to the matrix elements S111 and the like shown in FIG. 1, are disposed at respective points of intersection. For example, the key switch SW1 is connected to the common line COM1 on the switch side thereof and connected to the data line DAT1b on the contact side thereof. The other light key switches SW2, . . . , SW9 are connected in the same way as the key switch SW1. Further, diodes D11, D12, D13 are connected between the LED matrix 21a and the key switches SW1 and the like to prevent an excessive current from flowing from the receiving circuit 38 to the driving circuits 36, 37 or the LED matrix 21a when the key switches SW1 and the like are turned on. The diodes D11, D12, D13 are connected to the LED matrix 21a on the anode sides thereof and connected to the key switch SW1 and the like on the cathode sides thereof.

With this arrangement, common signals COM1, COM2, COM3 are supplied from the driving circuit 36 through the common lines COM. The common signals COM1, COM2, COM3 are also supplied to the driving circuit 37 as output data signals DAT1a, DAT2a, DAT3a through the light emitting diode D1 and the like. In the same way, the common signals COM1, COM2, COM3 are supplied to the receiving circuit 38 as input data signals DAT1b, DAT2b, DAT3b in correspondence with the pressed switch SW1 and the like.

Next, how respective signals change in the specific arrangement of the above LED matrix 21a and switch matrix 21b will be described.

FIG. 5 is a time chart showing the change of the respective signals on the common lines and the data lines. The time chart shows how signals change as time elapses. As shown in FIG. 3, these signals include signals supplied from the driving circuit 36 to the LED matrix 21a through the common lines COM, signals supplied from the LED matrix 21a to the driving circuit 37 through the data line DATa and signals supplied from the switch matrix 21b to the receiving circuit 38 through the data line DATb, and the like. FIG. 5 shows from the upper side thereof the common signals COM1, COM2, COM3, the output data signals DAT1a, DAT2a, DAT3a, the input data signals DAT1b, DAT2b, DAT3b and a scan signal SCN in the receiver RV38 shown in FIG. 3.

FIG. 5 shows a time chart when the light emitting diodes D1, D8 and D6 of FIG. 4 are emitted and the key switch SW5 is pressed. In FIG. 5, "H" designates a high signal level and "L" designates a low signal level, respectively.

In FIG. 5, the common signals COM1, COM2, COM3 are switched at predetermined intervals such as, for example, 4 [milliseconds] to supply pulses. For example, a pulse of the common signal COM1 is supplied first, a pulse of the common signal COM2 is supplied, and further a pulse of the common signal COM3 is supplied thereafter.

The common signal COM1 is at a high level from a time t1 to a time t2 so that the output data signal DAT1$a$ is at a high level to cause the light emitting diode D1 to emit light. The scan signal SCN is at a low level from a time (t2−$\Delta$t) to the time t2 to detect whether the key switches SW1, SW2, ..., SW9 are pressed or not. A period of time $\Delta$t during which the scan signal SCN is at the low level is, for example, 100 [microseconds]. Note, the scan signal SCN is at a high level in a usual state in which it does not carry out detection.

The common signal COM2 is at a high level from a time t2 to a time t3 so that the output data signal DAT3$a$ is at a high level to cause the light emitting diode D8 to emit light. Further, since the key switch SW5 is pressed, the input data signal DAT2$b$ is at a high level. Note, the scan signal SCN is at a low level during a period of time $\Delta$t from a time (t3−$\Delta$t) to the time t3 to detect whether the key switches SW1, SW2, ..., SW9 are pressed or not. Since the input data signal DAT2$b$ is at the high level during the period of time $\Delta$t, the receiving circuit 38 can detect the key switch SW5.

The common signal COM3 is at a high level from the time t3 to a time t4 so that the output data signal DAT2$a$ is at a high level to cause the light emitting diode D6 to emit light. The scan signal SCN is at a low level during a period of time $\Delta$t from a time (t4−$\Delta$t) to the time t4 to detect whether the key switches SW1, SW2, ..., SW9 are pressed or not. After the time t4, since the signals change in the same way as the change thereof from the time t1 to the time t4, the change of the signals is not described.

As described above, whether the key switches SW1, SW2, ... SW9 are pressed or not can be detected by switching the common signals COM1, COM2, COM3 at the predetermined intervals as well as causing desired ones of the light emitting diodes D1, D2, ..., D9 to emit light. Further, since a timing at which the scan signal SCN changes to a low level is set at the time $\Delta$t just before the time at which the common signals change, a detection error due to the rising-up delay of the pulses of the input data signals DAT1$b$, DAT2$b$, DAT3$b$ can be prevented. Although the light emitting diodes D1, D2, ... D9 intermittently emit light by switching the pulses of the common signals COM1, COM2, COM3, since the light seems to be emitted continuously due to the after image action of human eyes, no problem arises in a practical use.

Although the light emitting diodes or the key switches are applied as the matrix elements S111, S112, ..., elements such as toggle switches and the like which can be detected from the driving circuit 37, the receiving circuit 38 or the like may be applied.

As described above, according to the present invention, since the matrix elements are disposed to the switching matrixes in a matrix shape, the first driving circuit supplies common signals to the common lines, the second driving circuit receives output data signals from the data lines and the receiving circuit receives input data signals from the data lines. Unnecessary common lines can therefore be reduced to thereby suppress a cost to a low level.

We claim:

1. A numerically controlled machine tool including a numerical control unit for machining a workpiece according to an input command, comprising:

a plurality of switch matrices, each having a plurality of matrix elements disposed in a matrix format, each connected to one same set of common lines and each connected to a plurality of data lines;

a first driving circuit for supplying common signals to said one set of common lines connected to said plurality of switch matrices;

a second driving circuit for receiving output signals from a first group of said plurality of data lines connected to said plurality of switch matrices; and a receiving circuit for receiving input data signals from a second group of said plurality of data lines connected to said plurality of switch matrices.

2. A numerically controlled machine tool according to claim 1, wherein said matrix elements comprise light emitting diodes or key switches.

3. A numerically controlled machine tool according to claim 1, wherein said first driving circuit further switches said one set of common lines at predetermined intervals to supply said common signals.

4. A numerically controlled machine tool according to claim 1, wherein said first driving circuit further switches said one set of common lines after said receiving circuit receives said input data signals to supply said common signals.

* * * * *

UNITED STATES PATENT AND TRADEMARK OFFICE
CERTIFICATE OF CORRECTION

PATENT NO. : 5,483,460
DATED : January 9, 1996
INVENTOR(S) : Masuo KOKURA, et al.

It is certified that error appears in the above-indentified patent and that said Letters Patent is hereby corrected as shown below:

On the title page: Item [54] and Column 1, line 3, "NUMBERS" should be --NUMBER--.

Title Page, [57], in the Abstract, line 8, "DAT21" should be --DAT2ℓ--.

Signed and Sealed this

Sixteenth Day of April, 1996

Attest:

BRUCE LEHMAN

*Attesting Officer*     *Commissioner of Patents and Trademarks*